(12) United States Patent
Sung et al.

(10) Patent No.: US 7,904,920 B2
(45) Date of Patent: Mar. 8, 2011

(54) METHOD FOR SKIPPING ADVERTISEMENT BROADCASTING

(75) Inventors: Min Suk Sung, Nam-gu (KR); Sun Woo Park, Osan-shi (KR)

(73) Assignee: LG Electronics Inc., Seoul (KR)

( * ) Notice: Subject to any disclaimer, the term of this patent is extended or adjusted under 35 U.S.C. 154(b) by 264 days.

(21) Appl. No.: 11/531,943

(22) Filed: Sep. 14, 2006

(65) Prior Publication Data

US 2007/0124758 A1    May 31, 2007

(30) Foreign Application Priority Data

Nov. 28, 2005  (KR) .......... 10-2005-0113958
Nov. 28, 2005  (KR) .......... 10-2005-0114383

(51) Int. Cl.
*H04N 7/10* (2006.01)
(52) U.S. Cl. .......... 725/32; 725/34
(58) Field of Classification Search .......... 725/34
See application file for complete search history.

(56) References Cited

U.S. PATENT DOCUMENTS

| | | | | |
|---|---|---|---|---|
| 6,100,941 | A * | 8/2000 | Dimitrova et al. | 348/700 |
| 6,240,555 | B1 * | 5/2001 | Shoff et al. | 725/110 |
| 2003/0149988 | A1 * | 8/2003 | Ellis et al. | 725/87 |
| 2005/0097599 | A1 * | 5/2005 | Plotnick et al. | 725/32 |
| 2005/0163480 | A1 * | 7/2005 | Takemoto | 386/69 |
| 2006/0080725 | A1 * | 4/2006 | Paila | 725/135 |
| 2008/0022296 | A1 * | 1/2008 | Iggulden | 725/22 |
| 2008/0025389 | A1 * | 1/2008 | Markman et al. | 375/240.02 |

FOREIGN PATENT DOCUMENTS

JP    2003-032598    1/2003

OTHER PUBLICATIONS

Office Action dated Dec. 28, 2006 from the Korean Patent Office, 2 pages.

* cited by examiner

*Primary Examiner* — Brian T Pendleton
*Assistant Examiner* — Jean D Saint Cyr
(74) *Attorney, Agent, or Firm* — Fish & Richardson P.C.

(57) ABSTRACT

A method for skipping advertisement broadcasting is provided. Whether or not it is advertisement broadcasting is determined using an program ID of received broadcasting contents. When it is advertisement broadcasting, the advertisement is skipped. During the advertisement broadcasting skipping, a multi tasking environment other than broadcasting viewing is provided. By skipping advertisement broadcasting during the broadcasting content recording, the recording results not including the advertisement is obtained.

33 Claims, 6 Drawing Sheets

METHOD FOR SKIPPING ADVERTISEMENT BROADCASTING

BACKGROUND OF THE INVENTION

1. Field of the Invention

The present invention relates to a method for skipping an advertisement broadcasting.

2. Description of the Related Art

Commercial advertisement broadcasting is essential in TV broadcasting. In the case of an existing analog TV broadcasting, a digital TV broadcasting, a satellite DMB, or a terrestrial wave DMB, commercial advertisement broadcasting is also involved in commercial broadcasting and public broadcasting.

In terms of businessmen, the involvement of advertisement broadcasting is closely associated with profit generation. In terms of users of broadcasting receiver, advertisement broadcasting is used as a means of information acquisition. However, in some cases, the users often want to view and record desired programs consistently and ceaselessly, without any involvement of advertisement broadcasting.

SUMMARY OF THE INVENTION

Accordingly, the present invention is directed to a method for skipping an advertisement broadcasting that substantially obviates one or more problems due to limitations and disadvantages of the related art.

An object of the present invention is to provide a method for skipping a received advertisement broadcasting in a TV broadcasting receiver by separating the received advertisement broadcasting from the main broadcasting program.

Another object of the present invention is to provide a method for skipping a received advertisement broadcasting in a TV broadcasting receiver by separating the received advertisement broadcasting from the main broadcasting program, and recording only the main broadcasting program.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method for skipping an advertisement broadcasting, the method including: detecting information for discriminating between a program and advertisement broadcasting contents from received broadcasting signals; and skipping the corresponding advertisement broadcasting contents at an interval where information indicating advertisement broadcasting contents is detected.

In another aspect of the present invention, there is provided a method for skipping an advertisement broadcasting, the method including: detecting information for discriminating broadcasting contents from received broadcasting signals; registering advertisement broadcasting contents from the information for discriminating broadcasting contents; determining whether or not it is advertisement broadcasting by comparing the information for discriminating broadcasting contents with the registered information; and skipping corresponding advertisement broadcasting contents at a corresponding interval when it is advertisement broadcasting.

In a further another aspect of the present invention, there is provided a method for skipping an advertisement broadcasting, the method including: receiving DMB broadcasting at a DMB receiver; determining whether or not to skip advertisement broadcasting with respect to the received DMB broadcasting; detecting information representing advertisement broadcasting contents from received DMB broadcasting signals when it is an advertisement broadcasting skipping mode; and skipping corresponding advertisement broadcasting contents and performing a task other than DMB broadcasting viewing at an interval where the information representing advertisement broadcasting contents is detected.

In a still further another aspect of the present invention, there is provided a method for performing advertisement broadcasting skip recording, the method including: detecting information for discriminating contents from target broadcasting signals; determining whether or not it is advertisement broadcasting from the detected information; and temporarily terminating recording if it is advertisement broadcasting, and restarting the recording when target contents are received.

In a still further another aspect of the present invention, there is provided a method for performing advertisement broadcasting skip recording, the method including: detecting information for discriminating contents from target broadcasting signals; determining whether or not it is advertisement broadcasting from the detected information; temporarily terminating recording if it is advertisement broadcasting, and storing final position information of a file that is being recorded; determining whether or not advertisement broadcasting is terminated from the above detection operation; determining whether or not it is a previously-recorded broadcasting content from the above detection operation at the termination of the advertisement broadcasting; and restarting recording of a corresponding content on the basis of the stored final recording position information when it is the previously-recorded broadcasting content.

In a still further another aspect of the present invention, there is provided a method for performing advertisement broadcasting skip recording, the method including: detecting information for discriminating broadcasting contents from received broadcasting signals; registering advertisement broadcasting contents from the information for discriminating broadcasting contents; determining at recording whether or not it is advertisement broadcasting by comparing the information for discriminating broadcasting contents with the registered information; and temporarily terminating recording at a corresponding interval and skipping corresponding advertisement broadcasting contents at a corresponding interval when it is advertisement broadcasting.

In a still further another aspect of the present invention, there is provided a method for performing advertisement broadcasting skip recording, the method including: receiving DMB broadcasting at a DMB receiver; determining whether or not to record advertisement broadcasting with respect to the received DMB broadcasting; detecting information representing advertisement broadcasting contents from received DMB broadcasting signals when it is an advertisement broadcasting recording mode; and skipping corresponding advertisement broadcasting contents at an interval where the information representing advertisement broadcasting contents is detected, temporarily stopping recording until main broadcasting program ID is detected and then restarting the recording.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In describing the present invention, a DMB broadcasting system is exemplary illustrated and a PDA is illustrated as a receiver with a function of receiving a terrestrial DMB broadcasting.

Figure 1:
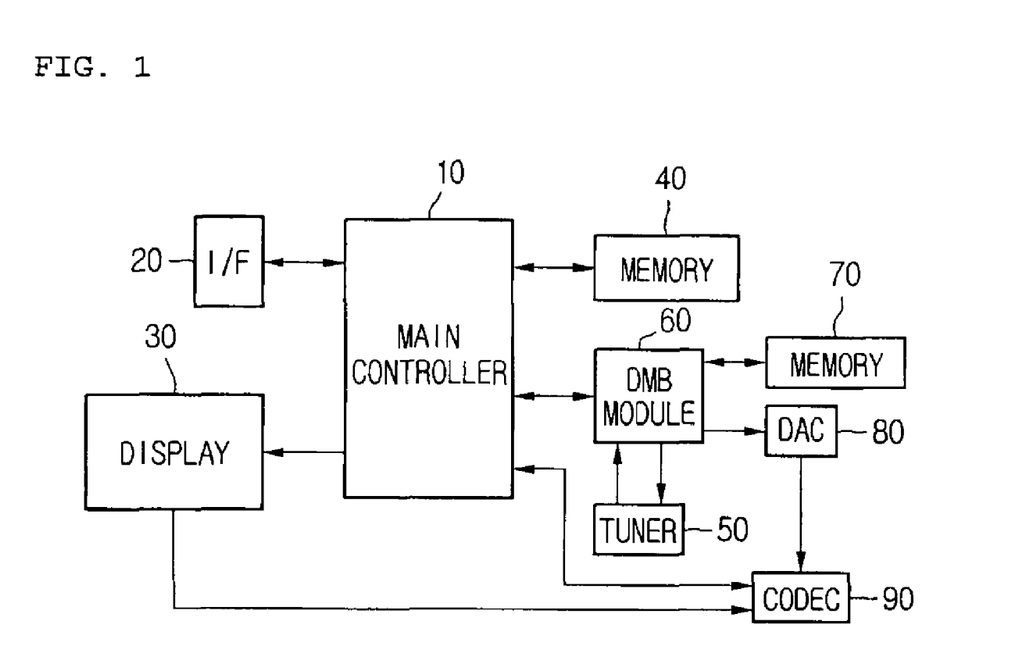
FIG. 1 is a block diagram of a DMB receiver to which the present is applied.

FIG. 1 is a block diagram of a DMB receiver to which the present is applied.

Referring to FIG. 1, a main controller 10 controls a receiver. An interface unit 20 performs key input, external memory interface, cradle connection, and display driving interface under the control of the main controller 20. A display is connected to the main controller 10 and provides video and data output and touch screen based user interface environments. A memory 40 serves to store and output data and applications including an OS related to receiver control of the main controller 10, and to record and output broadcasting contents. A tuner 50 functions to select a DMB broadcasting. A DMB module 60 functions to decode a DMB broadcasting of a channel selected by the tuner 50. A memory 70 is connected to the DMB module 60 and functions to store and output data and applications for receiving and decoding a DMB broadcasting. A DAC 80 performs a digital-to-analog conversion operation on a DMB broadcasting signal. A CODE 90 codes/decodes a DMB broadcasting signal and outputs A/V contents.

An advertisement broadcasting skip mode is set by user selection using the interface 20 or the display 30. The advertisement broadcasting skip mode may be set in advance in a default mode or may be set in real time during the DMB broadcasting reception by setting and inputting a hockey for skipping an advertisement broadcasting. When the advertisement broadcasting skip mode is set, the DMB module 60 discriminates advertisement broadcasting contents from DMB broadcasting signals of a channel selected by the tuner 50 under the control of the main controller 10. Whether or not the advertisement broadcasting contents exist is determined by including information indicating advertisement broadcasting contents into a heater, specifically program identification information (PMT-PID), transmitting the information, and receiving and decoding the information at the DMB module. Alternatively, the PMT-PID is detected, that the corresponding program is an advertisement content is identified according to a user response, the corresponding code value is registered in an advertisement broadcasting table (DB), and the corresponding content is determined as an advertisement broadcasting when the above code value is detected.

In case of the main broadcasting program, A/V contents processed by the DMB module 60 is processed by the DAC 80 and decoded by the CODEC 90. The decoded A/V signal is outputted through a speaker (or a headset) and the display 30. In case of the advertisement broadcasting, A/V output is stopped in a viewing skip mode, it is converted by the main controller 10 to an environment for performing a task other than the DMB broadcasting viewing of the PDA, recording is temporarily stopped in a recording mode and restarted when the main broadcasting program reception is restart after the termination of the advertisement broadcasting. When the skip interval of the advertisement broadcasting is ended, that is, when informing indicating the main broadcasting program is detected, the user is asked about whether or not to terminate the current task through the display 30. If the user wants the termination of the current task, a DMB broadcasting viewing (A/V output) mode is performed, and if not, a task other than the DMB broadcasting viewing continues to be performed until the user wants to view the main broadcasting program.

The DMB (digital multimedia broadcasting) is a service for converting multimedia contents (e.g., voice and video) into digital signals and providing the digital broadcasting signal to the receiver. The DMB is broadly classified into a terrestrial DMB and a satellite DMB. The DMB broadcasting is based on the MPEG2-TS standard, and transmits the A/V contents by multiplexing and packetizing the same. Each packet includes a header, and the header includes a PID as information for discriminating the broadcasting program. Also, the packet always includes a program map table (PMT) and a program association table (PAT) at its head. The PMT includes a code indicating the type of a transmitted program, and the PAT includes a code for searching the PMT, that is, information about the location of the PMT. The PMT and the PAT are continually transmitted during the program so as to provide against a data loss, that is, a case where the previously transmitted PMT and PAT are lost.

According to the present invention, information indicating whether current broadcasting contents are main broadcasting program contents or advertisement broadcasting contents is transmitted over the broadcasting signal. The receiver detects identification information of the received broadcasting signal and determines whether the current broadcasting contents are main broadcasting contents or advertisement broadcasting contents.

The information indicating that the broadcasting contents are the advertisement broadcasting contents may be included in a header. Also, the information may be included in PMT-PID. The information can include code indicating advertisement broadcasting, information indicating advertisement contents. For example, the information can include text information substantially indicating the advertisement contents.

In order to identify whether the current contents are the advertisement broadcasting in the received broadcasting signal, the DMB receiver detects the information indicating the advertisement broadcasting contents. When the information indicating the advertisement broadcasting contents is detected, the corresponding contents are determined as the advertisement broadcasting. Then, the advertisement broadcasting contents are skipped. Here, the skip process includes a stopping of the broadcasting viewing. The stopping of the broadcasting viewing includes a stopping of A/V output. If the broadcasting viewing is stopped, the receiver executes a task except the broadcasting viewing. This means that PDA with the DMB module mounted stops the A/V output of the DMB broadcasting and executes a task except the DMB broadcasting viewing. Generally, since the receivers such as PDA support multi-tasking, the A/V output of the advertisement broadcasting contents can be stopped and other task can be executed in this section.

The advertisement skipping function is automatically executed according to the user's setting. Also, when the current contents are determined as the advertisement broadcasting contents, the advertisement skipping function inquires the user of whether to skip the advertisement broadcasting, and executes an appropriate operation according to the response. The method for inquiring whether or not to execute the skipping of the advertisement broadcasting and receiving the response is implemented by providing a unit that enables the user to make the response to the receiver interface. For example, by assigning a hot key, the skipping of the advertisement broadcasting according to the user's response can be determined.

If the PMT-PID of main broadcasting program is detected while skipping the advertisement broadcasting contents, the process automatically returns to the main DMB reception mode, or inquires the user of whether to continue the current task or to finish the current task and then return to the DMB reception mode. Then, an appropriate operation according to the response is performed.

The method of inquiring whether to continue or finish the current task and receiving the response can be implemented by providing a unit that can enable the user to make the response to the receiver interface. For example, by assigning a hot key, whether to return to the main broadcasting according to the user's response can be determined.

The information indicating the advertisement broadcasting contents is updated. That is, if information (e.g., a specific code value) is determined as the information indicating the advertisement broadcasting contents, the corresponding broadcasting can be determined as the advertisement broadcasting when the corresponding code value is detected. The information is stored as information identifying the advertisement contents in a memory of the receiver. The stored information is used as a code value for identifying the advertisement broadcasting. When a new code value is received, a process of registering the new code value as a new advertisement PID in a memory table is performed.

When the current contents are determined as the advertisement broadcasting contents, information indicating the actual contents of the corresponding advertisement broadcasting can be displayed in a caption. That is, when a task other than the broadcasting viewing is executed in the skip section of the advertisement broadcasting contents, the text information substantially indicating the advertisement contents is decoded and the decoded contents are displayed in a caption. In this case, although the A/V broadcasting itself is interrupted, the information indicating the advertisement contents is processed in a caption. Therefore, the user can know at least the contents of the advertisement broadcasting. This function can be effectively used to alleviate or avoid the interest conflict among the advertiser, the businessmen, and the users in the commercial broadcasting.

Figure 2:
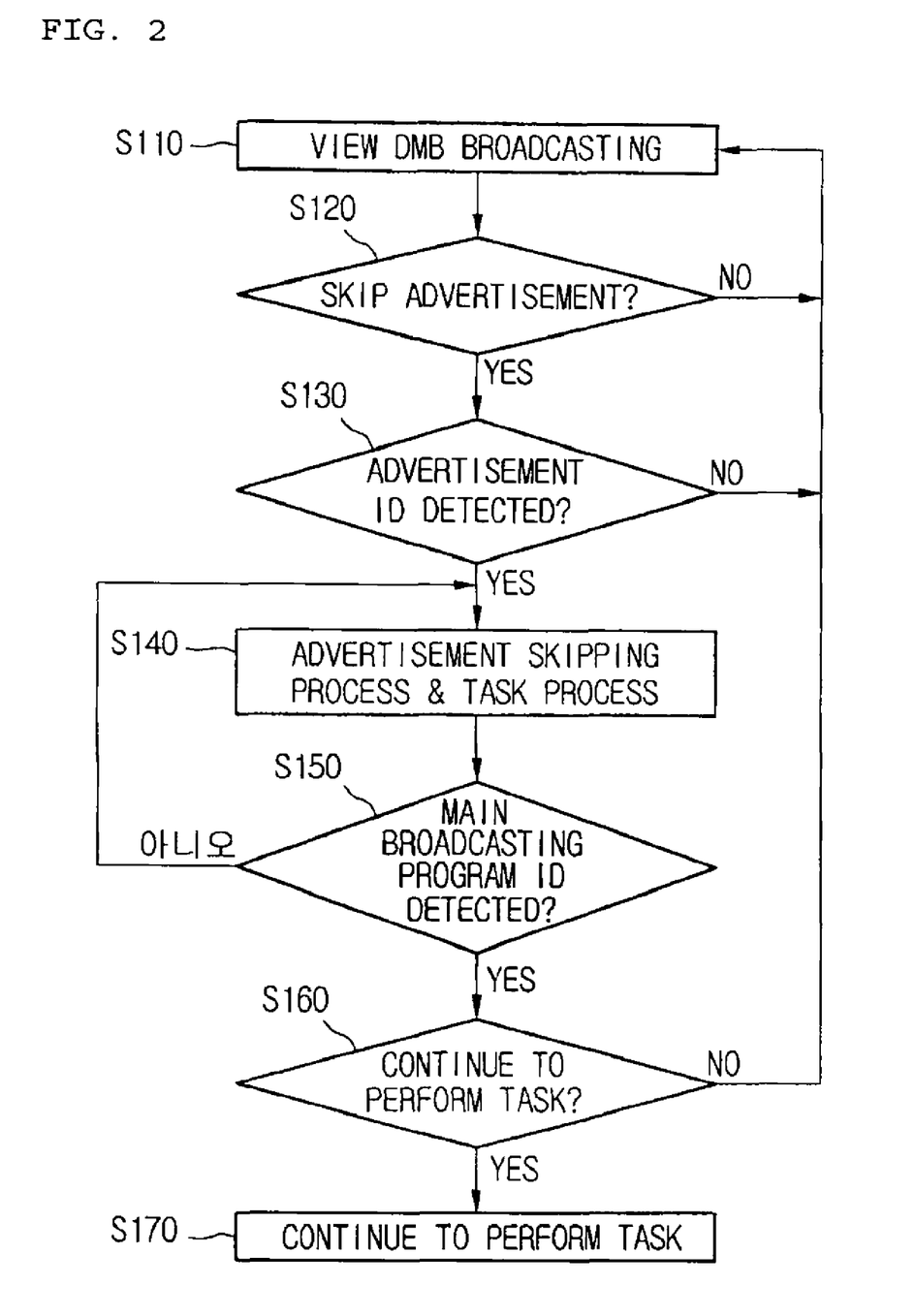
FIG. 2 is a flowchart illustrating a method for skipping an advertisement broadcasting according to a first embodiment of the present invention.

FIG. 2 is a flowchart illustrating a method for skipping an advertisement broadcasting according to a first embodiment of the present invention. In the method, when an advertisement skip mode is selected during DMB broadcasting viewing, advertisement interval skipping and a task other than the broadcasting viewing at the advertisement interval are performed according to the detection results.

Referring to FIG. 2, in operation S110, DMB broadcasting is viewed. In operation S210, DMB broadcasting of a channel selected by a user is selected and decoded, and an A/V output is performed.

In operation S120, whether or not it is an advertisement skipping mode is determined. The advertisement skipping mode may be set in real time with a hockey by the user during the reception of the current DMB broadcasting, or may be set in advance in an OS default mode. When the advertisement skipping mode is not set, the DMB broadcasting viewing continues. On the contrary, when the advertisement skipping mode is set, the method proceeds to operation S130. In operation S130, whether or not the current broadcasting content is advertisement broadcasting is determined. For this determination, a code value indicating the advertisement broadcasting is included in the PMT-PID, for example, and is transmitted. Thereafter, whether or not the code value is detected at a receiver is determined for the above determination.

Table 1 below illustrates an example of the PMT-PID table. Table 1 is stored in a memory of the receiver. Whether or not the current broadcasting content is advertisement broadcasting and the content of the advertisement broadcasting can be determined. The actual content of the advertisement can be provided in text and can be used in an advertisement caption process operation that will be described layer.

TABLE 1

| Code | Contents (caption) |
|------|--------------------|
| 0x04 | LG Electronics X-note www.lge.com |
| 0x05 | LG Electronics WHISEN www.lge.com |
| 0x06 | LG Fashion DAKS www.lge.com |
| ... | ... |

When the advertisement ID is not detected in operation S130, since the current content is the main broadcasting program, the DMB broadcasting viewing continues. When the advertisement ID is detected in operation S130, the method proceeds to operation S140. In the fourth operation S140, an advertisement interval is skipped and a task other than the broadcasting viewing (A/V output) is performed. This is based on the fact that receivers such as a PDA generally support a multi-tasking function.

In operation S150, whether or not the main broadcasting program ID is detected is determined. If the advertisement broadcasting is terminated and the main broadcasting is received, the method proceeds to operation S160. In operation S160, whether or not to continue to perform the current task is determined so as to determine whether or not to return to the DMB main broadcasting program viewing. For this purpose, the main controller 10 performs an inquiry for inducing the selection of the corresponding contents at the display 30, and whether or not to perform the above operation may be determined according to a user response. When the response for terminating the current task is generated, the method proceeds to operation S170. In operation S170, the corresponding task continues to be performed. Thereafter, the user may input a response/command for return to the main broadcasting program viewing by a key interface or a touch screen interface at any time. When the return command is inputted, the DMB broadcasting viewing operation is performed.

Figure 3:
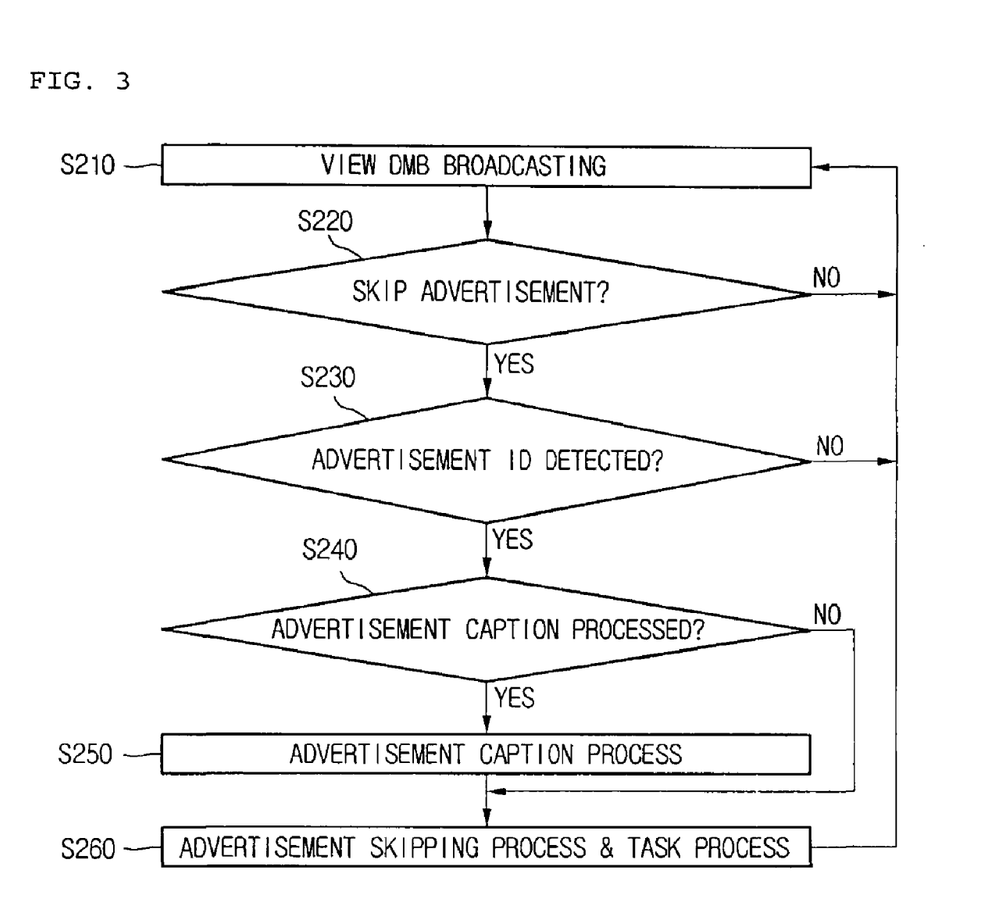
FIG. 3 is a flowchart illustrating a method for skipping an advertisement broadcasting according to a second embodiment of the present invention.

FIG. 3 is a flowchart illustrating a method for skipping an advertisement broadcasting according to a second embodiment of the present invention. In the method, when an advertisement skip mode is selected during DMB broadcasting viewing, advertisement interval skipping, a task other than the broadcasting viewing at the advertisement interval, and advertisement caption process using information actually representing the broadcasting content are performed according to the detection results.

Referring to FIG. 3, in operation S210, DMB broadcasting is viewed. In operation S210, DMB broadcasting of a channel selected by a user is selected and decoded, and an A/V output is performed.

In operation S220, whether or not it is an advertisement skipping mode is determined. The advertisement skipping mode may be set in real time with a hockey by the user during the reception of the current DMB broadcasting, or may be set in advance in an OS default mode. When the advertisement skipping mode is not set, the DMB broadcasting viewing continues. On the contrary, when the advertisement skipping mode is set, the method proceeds to operation S230. In operation S230, whether or not the current broadcasting content is advertisement broadcasting is determined. For this determination, a code value indicating the advertisement broadcasting is included in the PMT-PID, for example, and is transmitted. Thereafter, whether or not the code value is detected at a receiver is determined for the above determination.

When the advertisement ID is not detected in operation S230, since the current content is the main broadcasting program, the DMB broadcasting viewing continues. When the advertisement ID is detected in operation S230, the method proceeds to operation S240. In the fourth operation S240, it is determined whether or not to caption-process information actually including the advertisement content among the advertisement contents where the A/V output is skipped, for example, the advertisement content information provided in text type in Table 1. The setting in the fourth operation S240 may be designated in advance or in response user inquiry. When the advertisement caption process is required, the method proceeds to operation S250. In operation s250, the A/V output is skipped, but information representing the advertisement content extracted from the corresponding advertisement broadcasting contents is decoded and displayed in a caption in the display during the skip interval. This enables the user to perceive the kind of the advertisement even in a state where the advertisement A/V output is skipped, thereby preventing the useful advertisement information from being undesirably blocked.

In operation S260, the advertisement interval skipping and a task other than the broadcasting viewing (A/V output) are performed in the skip interval. This is based on the fact that receivers such as a PDA generally support a multi-tasking function.

The previous operations of operation S150 of FIG. 2 may be performed after operation S260. That is, when whether or not the main broadcasting program ID is detected is determined and the main broadcasting program is received, whether or not to continue to perform the current task is determined so as to determine whether or not to return to the main broadcasting program viewing. For this purpose, the main controller 10 performs an inquiry for inducing the selection of the corresponding contents at the display 30, and whether or not to perform the above operation may be determined according to a user response. When the response for terminating the current task is generated, the method returns to the operation of viewing the main broadcasting program. In this operation, the corresponding task continues to be performed when a response for the continuation of the current task. Thereafter, the user may input a response/command for return to the main broadcasting program viewing by a key interface or a touch screen interface at any time. When the return command is inputted, the DMB broadcasting viewing operation is performed.

Figure 4:
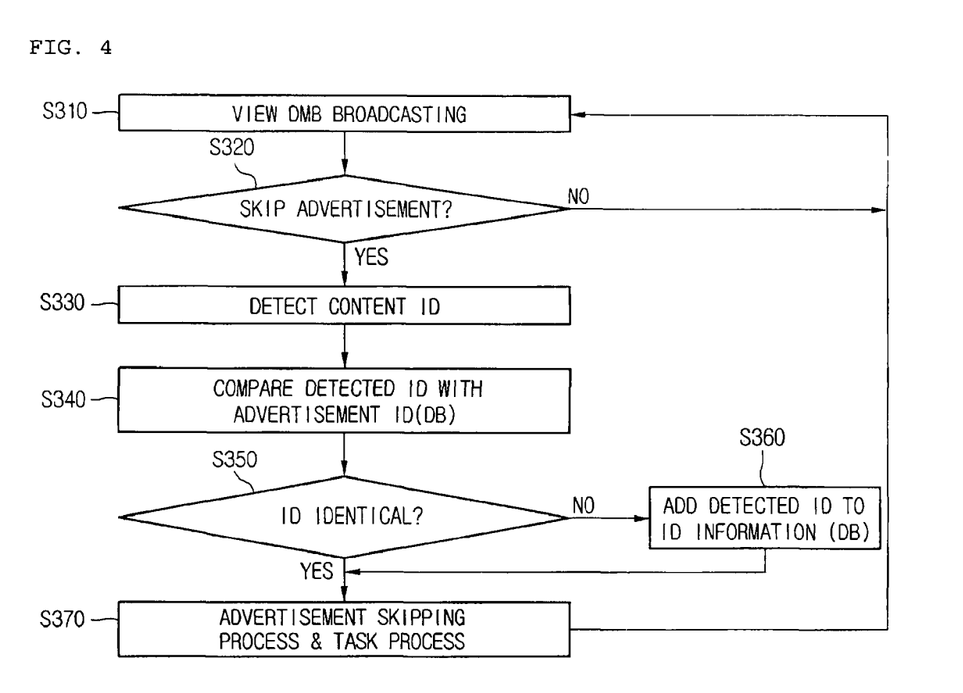
FIG. 4 is a flowchart illustrating a method for skipping an advertisement broadcasting according to a third embodiment of the present invention.

FIG. 4 is a flowchart illustrating a method for skipping an advertisement broadcasting according to a third embodiment of the present invention. In the method, when an advertisement skip mode is selected during DMB broadcasting viewing, advertisement interval skipping and a task other than the broadcasting viewing at the advertisement interval are performed according to the detection results. An advertisement broadcasting code value is registered (updated) according to the content ID, and whether the broadcasting content is the main broadcasting program or the advertisement broadcasting is determined using the registered advertisement broadcasting code value. This embodiment may be applied to both a case where the broadcasting content provider (e.g., a broadcasting station) provides information (a code value) for discriminating whether a corresponding content is a main broadcasting program or an advertisement broadcasting content and another case where the broadcasting content provider does not provide the above information. The embodiment can be more usefully applied to the latter case. That is, even when the broadcasting station does not provide the above information, when the ID (the code value) on the corresponding contents is given, information for indicating that the code value represents advertisement broadcasting is stored in a database of the receiver, and whether or not the current content is advertisement broadcasting can be determined by comparing the detected program ID (code value) with the registered information.

Referring to FIG. 4, in operation S310, DMB broadcasting is viewed. In operation S310, DMB broadcasting of a channel selected by a user is selected and decoded, and an A/V output is performed.

In operation S320, whether or not it is an advertisement skipping mode is determined. The advertisement skipping mode may be set in real time with a hockey by the user during the reception of the current DMB broadcasting, or may be set in advance in an OS default mode. When the advertisement skipping mode is not set, the DMB broadcasting viewing continues. On the contrary, when the advertisement skipping mode is set, the method proceeds to operation S330. In operation S330, the ID of the current broadcasting content is detected. In operation S340, the detected ID is compared with the advertisement ID stored in the memory of the receiver.

That is, the receiver detects information indicating the kind of the broadcasting content, for example, a program code value included in the PMT-PID ID, and determines, by using the detected information, whether or not the currently-received content is advertisement broadcasting.

In operation S350, the stored ID (the advertisement ID) is compared with the detected ID. In this operation S350, when the detected ID is not identical to the stored advertisement ID, since the detected ID is new advertisement ID, the new information is added to the previous advertisement ID (DB). When the identical ID already exists, the method proceeds to operation S370 to perform the advertisement skipping operation and the task process.

In operation S370, the advertisement interval skipping and a task other than the broadcasting viewing (A/V output) are performed in the skip interval. This is based on the fact that receivers such as a PDA generally support a multi-tasking function.

The previous operations of operation S150 of FIG. 2 may be performed after operation S370. That is, when whether or not the main broadcasting program ID is detected is determined and the main broadcasting program is received, whether or not to continue to perform the current task is determined so as to determine whether or not to return to the main broadcasting program viewing. For this purpose, the main controller 10 performs an inquiry for inducing the selection of the corresponding contents at the display 30, and whether or not to perform the above operation may be determined according to a user response. When the response for terminating the current task is generated, the method returns to the operation of viewing the main broadcasting program. In this operation, the corresponding task continues to be performed when a response for the continuation of the current task. Thereafter, the user may input a response/command for return to the main broadcasting program viewing by a key interface or a touch screen interface at any time. When the return command is inputted, the DMB broadcasting viewing operation is performed.

The advertisement caption process may also performed as described with reference to 3. This can be implemented by adding the fourth and fifth operations S240 and S250 of FIG. 3 before operation S370 of FIG. 4.

The methods illustrated in FIGS. 2, 3 and 4 may be combined to one another, and may be properly applied according to the broadcasting environments, the external environments, and the implementation of th receiver.

Figure 5:
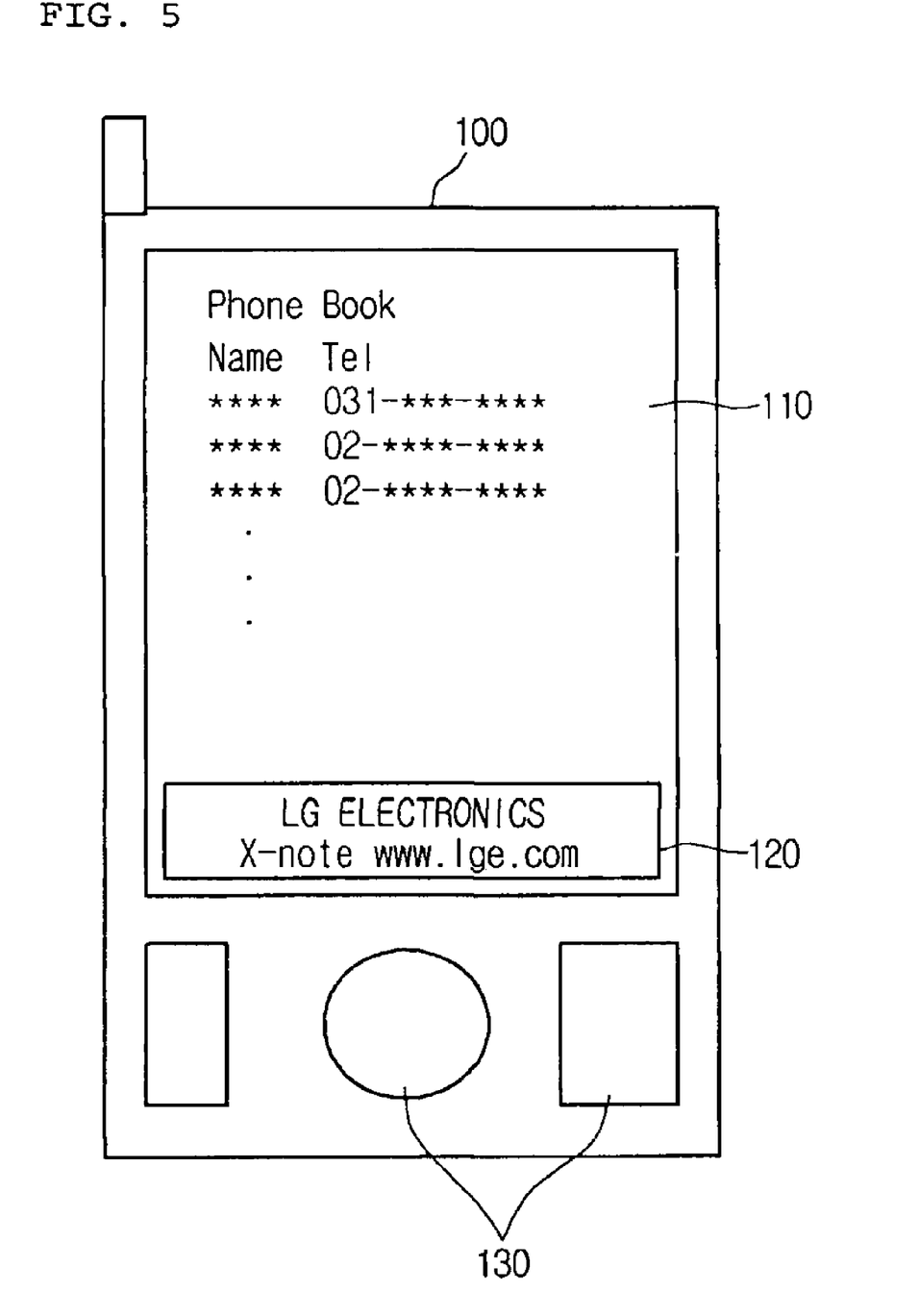
FIG. 5 is a diagram illustrating an example of an advertisement broadcasting caption processing picture for skipping an advertisement broadcasting.

FIG. 5 is a diagram illustrating an example of an advertisement broadcasting caption processing picture for skipping an advertisement broadcasting. A phonebook search/edit window 110 is illustrated as an example of a multi tasking operation that can be executed in a display window of a PDA 100 while skipping the advertisement broadcasting. A caption 120 in which advertisement contents are processed in a text format is displayed on a lower portion of the display window. Here, the position of the caption 120 can be freely adjusted according to the user's selection. The adjustment of the caption position can be easily achieved by controlling the position of the caption 120 displayed on the display 30 in main controller, corresponding to the position adjustment command inputted by the user through the interface, such as key or touch screen. The PDA 100 includes a key 130 for allowing the user to input the device manipulation command. If necessary, one key can be assigned as a hot key, such as "advertisement skip" or 'caption process', 'return to DMB broadcasting viewing', and so on.

The present invention provides a method for automatically detecting and skipping the advertisement broadcasting, such that the unwanted broadcasting viewing can be interrupted. Also, the present invention provides a method for receiving information summarizing the actual broadcasting contents in a text type, and decoding the received information, and processing the decoded information in a caption in the display. Further, the parallel operations of the receivers can be achieved based on the multi tasking while skipping the advertisement broadcasting. Therefore, it is very useful. By skipping the advertisement broadcasting, the A/V output can be interrupted. Therefore, unnecessary power consumption in the advertising broadcasting viewing can be reduced in the portable device.

Figure 6:
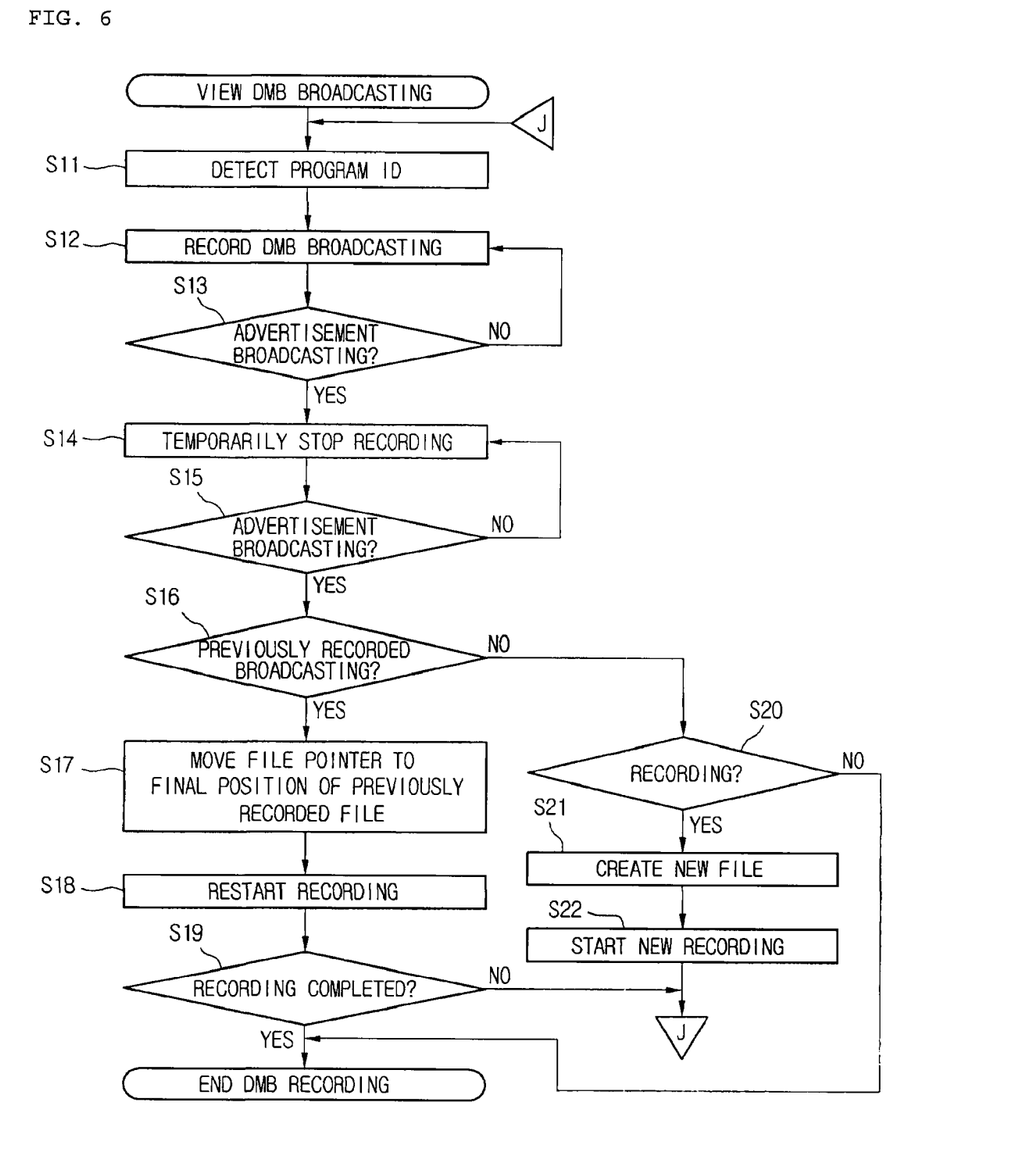
FIG. 6 is a flowchart illustrating a method for skipping an advertisement broadcasting according to an embodiment of the present invention.

FIG. 6 is a flowchart illustrating a method for skipping an advertisement broadcasting according to an embodiment of the present invention. When recording the DMB broadcasting, if the advertisement skip mode is selected, the process of skipping and recording advertisement broadcasting and resuming recording the advertisement broadcasting according to the detected result of the advertisement ID is performed.

The viewing of the DMB broadcasting selects the DMB broadcasting signal of the channel selected by the user. The A/V output is achieved by decoding the selected broadcasting signal. The recording of the DMB broadcasting can be executed in real time or reserved according to the user's selection.

The broadcasting skip recording mode is set in the interface 20 or a touch-screen based display 30 according to the user's selection. The advertisement broadcasting skip recording mode can be previously set as a default. By assigning a hot key for the advertisement broadcasting skip recording while recording the DMB broadcasting, the advertisement broadcasting skip recording mode can be set in real time from the input of the hot key. If the skip recording mode for the advertisement broadcasting is set, the DMB module 60 discriminates the advertisement broadcasting contents among the DMB broadcasting of the channel selected by the tuner 50 under the main controller 10.

As the discrimination result based on the program ID, if the current contents are main broadcasting program, the A/V contents processed in the DMB module 60 are decoded according to the driving of the CODE through the DAC 80. The decoded A/V signal is outputted through a speaker (or a headset) and a display 30 and is recorded in a memory. If the current contents are the advertisement broadcasting contents, the recording is stopped. When the skip section of the advertisement broadcasting is finished, that is, when the information indicating main broadcasting program is detected, the recording resumes. For the resuming of the recording, the position information of the finally recorded file is stored in the memory until the advertisement broadcasting is detected. When the advertisement broadcasting is finished, it is determined whether or not the current contents are the previously recorded broadcasting contents by using the detected ID. If the current contents are the previously recorded broadcasting contents, the recording resumes. If the current contents are new broadcasting contents, whether to perform or finish the recording is determined according to the selection as to whether or not the recording is performed.

If the PMT-PID of the main broadcasting program is detected while skipping the advertisement broadcasting contents, the recording automatically resumes. If the contents are not the previously recorded contents but new contents, whether to record the new broadcasting contents is inquired and an appropriate operation is performed according to a corresponding response.

In operation S11, program ID is detected from the recording object, that is, (recorded) DMB broadcasting signal. The program ID indicates whether the corresponding contents are main broadcasting program or advertisement broadcasting.

In operation S12, the received DMB broadcasting signal is stored in a memory (a storage). The recording of the DMB broadcasting can be selected in real time while viewing, or can be reserved.

In operation S13, when the advertisement skip recording mode is selected, it is determined whether the current broadcasting contents are advertisement broadcasting from the program ID thereof. The advertisement skip recording mode can be set in real time while receiving and/or recording the current DMB broadcasting by using a hot key, or can be previously set as a default in an operating system (OS). In the advertisement skip recording mode, it is determined whether or not the current broadcasting contents are advertisement broadcasting. A code value indicating the advertisement broadcasting is loaded on the information (e.g., PMT-PID information) indicating that the broadcasting contents are advertisement broadcasting, and then is transmitted. The receiver determines the advertisement broadcasting by detecting the code value.

In operation S13, when the advertisement ID is not detected, the current broadcasting contents are the main broadcasting program. Therefore, the DMB broadcasting is continuously recorded. When the advertisement ID is detected, the process proceeds to operation S14. In operation S14, the recording is paused for the skip process of the advertisement section. At this point, the final recording position information of the existing recorded program file is stored in the memory together with the program ID.

In operation S51, it is determined whether or not the advertisement broadcasting is finished and the main broadcasting program starts. That is, it is determined whether or not the program ID is detected. If the advertisement broadcasting is finished and the main broadcasting program is received, the process proceeds to operation S16. That is, it is determined whether or not the detected ID is the existing recorded broadcasting program. If the detected ID is the previously recorded broadcasting program, the process proceeds to operation S17. That is, a file pointer moves to the end of the recorded file. In operation S18, the advertisement broadcasting is skipped and the recording resumes such that the main broadcasting program can be recorded successively.

In operation S19, it is determined whether or not the recording of the corresponding contents after the resuming of the recording is completed. If the recording of the corresponding contents is not completed, the process proceeds to operation S11. The recording based on the skipping of the advertisement broadcasting is continued. If the recording of the corresponding contents is completed, the DMB recording is finished.

If the detected ID is not the previously recorded broadcasting program, it means the new broadcasting program. The process proceeds to operation S20. That is, it is determined whether or not to record the new broadcasting contents. This can be determined by the user's response, or can be automatically executed when several broadcasting programs are recorded successively. When the new broadcasting program is not recorded, the DMB recording is terminated. When the new broadcasting program is wanted to be recorded, the process proceeds to operation S21. In operation S21, the new recording file is created. In operation S22, the new broadcasting program starts to be recorded. The recording process based on the advertisement skip is performed on the new broadcasting program from operation S11.

In the recording process based on the advertisement skip, as described above, the code value of the advertisement broadcasting can be updated (recorded) according to the content identification information, and it can be determined whether the broadcasting contents are the main broadcasting program or the advertisement broadcasting using the recorded coded value of the advertisement broadcasting.

The program ID of the current broadcasting contents is detected, and the detected ID is compared with the advertisement ID previously stored in the memory. This means that the program code value contained in information (e.g., PMT-PID) information) indicating kind of the broadcasting contents is detected in the receiver and is used to determine whether or not the contents are the advertisement broadcasting. If the detected ID does not coincide with the previously stored advertisement broadcasting ID, it means the new advertisement ID. Therefore, the process of additionally registering the new advertisement ID in the existing advertisement identification information (DB) is performed. When the detected ID coincides with the advertisement broadcasting, the advertisement skip recording is processed.

According to the present invention, the receiver records only the main broadcasting program by automatically detecting and skipping the advertisement broadcasting. Therefore, the recording of the advertisement broadcasting that the user does not want can be interrupted. Also, since the recording can be performed while deleting the advertisement, and the portion where the advertisement is deleted can be replayed, the portable device can reduce unnecessary memory usage and power consumption, which are followed by the recording and replaying of the advertisement broadcasting It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method comprising:
    receiving broadcasting signals from a broadcasting system;
    displaying the received broadcasting signals;
    detecting information for discriminating between a program and advertisement broadcasting content from the broadcasting signals received from a broadcasting system;
    assessing existence of an advertisement broadcast content skipping interval;
    skipping the corresponding advertisement broadcasting content during the advertisement broadcast content skipping interval where information indicating advertisement broadcasting content is detected;
    decoding text information corresponding to the skipped advertisement broadcasting content; and
    during an advertisement broadcasting content skipping interval, simultaneously displaying the decoded text information corresponding to the skipped advertisement broadcasting content and information reflecting a task executed by a user including at least one of a task of searching or editing, wherein the task is other than displaying received broadcast signals, and the information reflecting the task is independent of the displayed broadcasting signals.

2. The method according to claim 1, wherein a receiver terminates advertisement broadcasting viewing at the advertisement broadcasting content skipping interval.

3. The method according to claim 1, wherein:
    displaying the decoded information corresponding to the skipped advertisement broadcasting comprises displaying the decoded information corresponding to the skipped advertisement broadcasting content as a caption during the advertisement broadcasting content skipping interval.

4. The method according to claim 1, wherein:
    displaying the decoded information corresponding to the skipped advertisement broadcasting content comprises displaying the decoded information corresponding to the skipped advertisement broadcasting content as a caption during the advertisement broadcasting content skipping interval according to user selection.

5. The method according to claim 1, wherein the information indicating advertisement broadcasting content is included in a header that is transmitted from the broadcasting system in a packet-based digital broadcasting system.

6. The method according to claim 1, wherein the information indicating advertisement broadcasting content is included in a PMT-PID table that is transmitted from the broadcasting system in a packet-based digital broadcasting system.

7. The method according to claim 1, wherein the information indicating advertisement broadcasting content includes information representing advertisement content in a packet-based digital broadcasting system.

8. The method according to claim 1, wherein the information indicating advertisement broadcasting content includes text information representing advertisement content in a packet-based digital broadcasting system.

9. The method according to claim 1, wherein the information indicating advertisement broadcasting content is updated at a receiver, wherein the information is received from a broadcasting system.

10. The method according to claim 1, wherein the skipping of advertisement broadcasting content are performed automatically or manually according to user selection.

11. The method according to claim 1, wherein the decoded information includes text information substantially indicating the skipped advertisement broadcasting content.

12. The method according to claim 1, the operation of the skip of the corresponding advertisement broadcasting content is directly performed on a receiver without storing or displaying it.

13. The method of claim 1, wherein during an advertisement broadcasting content skipping interval, simultaneously displaying the decoded text information corresponding to the skipped advertisement broadcasting content and information reflecting a task other than displaying received broadcast signals comprises:
   terminating the display of the received broadcasting signals;
   executing a task unrelated to the received broadcast signals;
   simultaneously displaying the decoded text information corresponding to the skipped advertisement broadcasting content and outputs of the executed task.

14. The method of claim 13, wherein simultaneously displaying the decoded text information corresponding to the skipped advertisement broadcasting content and outputs of the executed task comprises displaying the outputs of the executed task on a majority of a display screen, while simultaneously displaying the decoded text information corresponding to the skipped advertisement broadcasting content on the remainder of the display screen.

15. A comprising:
   receiving broadcasting signals from a broadcasting system;
   detecting information for discriminating broadcasting content from the received broadcasting signals;
   registering advertisement broadcasting content from the information for discriminating broadcasting content;
   determining whether or not it is advertisement broadcasting by comparing the information for discriminating broadcasting content with the registered information;
   decoding information representing advertisement broadcasting content;
   assessing existence of an advertisement broadcast content skipping interval;
   skipping corresponding advertisement broadcasting content during the corresponding advertisement broadcasting content skipping interval when it is advertisement broadcasting; and
   instead of displaying the advertisement broadcasting content, simultaneously displaying the decoded information corresponding to the skipped advertisement broadcasting content as a caption during the advertisement broadcasting content skipping interval and information reflecting a task executed by a user including at least one of a task of searching or editing, wherein the task is other than displaying received broadcasting signals, and the information reflecting the task is independent of the displayed broadcasting signals.

16. The method according to claim 15, wherein the information for discriminating advertisement broadcasting content further includes information for representing broadcasting content.

17. The method according to claim 15, wherein the information indicating advertisement broadcasting content is included in a header that is transmitted from a broadcasting system in a packet-based digital broadcasting system.

18. The method according to claim 15, wherein the information indicating advertisement broadcasting content is included in a PMT-PID table that is transmitted from a broadcasting system in a packet-based digital broadcasting system.

19. A method comprising:
   receiving DMB broadcasting from a broadcasting system at a DMB receiver;
   detecting information representing advertisement broadcasting content from the received DMB broadcasting signals when the DMB receiver is operating in an advertisement broadcasting skipping mode;
   based on detecting the information representing advertisement broadcasting content, determining to skip advertisement broadcasting based on a header information of a packet transmitted from a broadcasting system with respect to the received DMB broadcasting;
   based on determining to skip advertisement broadcasting, skipping corresponding advertisement broadcasting content while receiving the DMB broadcasting and performing a task other than displaying received broadcasting signals at an interval where the information representing advertisement broadcasting content is detected;
   after skipping corresponding advertisement broadcasting content, detecting information representing program broadcasting content from the received DMB broadcasting signals;
   as a result of detecting information representing program broadcasting content from the received DMB broadcasting signals, determining whether to continue to perform the task other than displaying received broadcasting signals;
   when determining to continue to perform the task other than viewing broadcasting signals, continuing to perform the task other than viewing broadcasting signals; and
   when determining to not continue to perform the task other than viewing broadcasting signals, displaying the received DMB broadcasting.

20. The method according to claim 19, further comprising:
   decoding text information corresponding to the skipped advertisement broadcasting content; and
   displaying the decoded information corresponding to the skipped advertisement broadcasting content simultaneously with the task other than displaying received broadcast, as a caption during the advertisement broadcasting content skipping interval.

21. The method of claim 19, wherein determining whether to continue to perform the task other than displaying received broadcasting signals comprises:
   receiving a user input indicating whether to continue to perform the task other than displaying received broadcasting signals; and
   based on the received user input, determining whether to continue to perform the task other than displaying received broadcasting signals.

22. A method comprising:
   receiving target broadcasting signals from a broadcasting system including program broadcasting;
   recording the target broadcasting signals;
   detecting information for discriminating various content in the received target broadcasting signals;
   determining using the detected information that the target broadcasting signals are advertisement broadcasting;
   based on determining that the target broadcasting signals are advertisement broadcasting, temporarily terminating recording of the target broadcasting;
   after temporarily terminating recording of the target broadcasting signals, determining using the detected information that the target broadcasting signals are program broadcasting;
   as a result of determining that the target broadcasting signals are program broadcasting, determining whether to restart recording the target broadcasting signal;
   when determining to restart recording the target broadcasting signal, restarting recording of the target broadcasting signal at a stored final recording position when the target broadcasting signals correspond to previously-recorded program broadcasting content according to the detected information, and at a new position when the target broadcasting signals correspond to new broadcasting content; and
   when determining to not restart recording the target broadcasting signal, continuing to terminate recording of the target broadcasting signals.

23. The method according to claim 22, wherein the information indicating advertisement broadcasting is included in a header that is transmitted from a broadcasting system in a packet-based digital broadcasting system.

24. The method according to claim 22, wherein the information indicating advertisement broadcasting is included in a PMT-PID table that is transmitted from a broadcasting system in a packet-based digital broadcasting system.

25. The method according to claim 22, wherein the information indicating advertisement broadcasting is updated at a receiver and the information is received from a broadcasting system.

26. The method according to claim 22, wherein determining whether to restart recording the target broadcasting signal comprises determining whether the determined program broadcasting is associated with the previously-recorded broadcasting content.

27. The method according to claim 11, wherein recording the target broadcasting signals is performed at a DMB broadcasting system receiver.

28. The method according to claim 22, wherein recording the target broadcasting signals is performed at a DMB broadcasting system receiver.

29. The method of claim 22, wherein determining whether to restart recording the target broadcasting signal comprises:
   receiving a user input indicating whether to restart recording the target broadcasting signal; and
   based on the received user input, determining whether to restart recording the target broadcasting signal.

30. A method comprising:
   receiving target broadcasting signals from a broadcasting system;
   recording the target broadcasting signals;
   detecting information included in a header of a packet transmitted from the broadcasting system for discriminating various content of the target broadcasting signals;
   determining, using the detected information, that the target broadcasting signals are advertisement broadcasting;
   decoding text information corresponding to content of the advertisement broadcasting;
   temporarily terminating recording and storing final position information of a file in which the broadcasting signals are being recorded;
   during an advertisement broadcasting content skipping interval, simultaneously displaying the decoded text information corresponding to the skipped advertisement broadcasting content and information reflecting a task other than displaying received broadcast signals;
   determining, using the detected information, that the advertisement broadcasting has terminated and program broadcasting has begun;
   as a result of determining that the advertisement broadcasting has terminated and program broadcasting has begun, determining that the program broadcasting corresponds to previously-recorded broadcasting;
   based on determining that the program broadcasting corresponds to previously-recorded broadcasting content, restarting recording of the target broadcasting signals at a stored final recording position information when the program broadcasting correspond to the previously-recorded broadcasting content;
   as a result of determining that the advertisement broadcasting has terminated and program broadcasting has begun, determining whether to continue to perform the task other than displaying received broadcasting signals;
   when determining to continue to perform the task other than displaying broadcasting signals, continuing to perform the task other than displaying broadcasting signals; and
   when determining to not continue to perform the task other than displaying broadcasting signals, displaying the program broadcasting.

31. The method according to claim 30, wherein:
   the information indicating advertisement broadcasting content is included in the header in a packet-based digital broadcasting system, and each packet includes the header having a program identification information (PID) as information for discriminating the broadcasting program, and
   the advertisement broadcasting content are discriminated from the target broadcasting signals according to the header information transmitted from the broadcasting system.

32. The method according to claim 30, wherein the information indicating advertisement broadcasting content is included in a PMT-PID table in a packet-based digital broadcasting system.

33. The method according to claim 30, wherein the information indicating advertisement broadcasting content is updated at a receiver, wherein the information is received from a broadcasting system.

* * * * *